United States Patent
Guenter et al.

(10) Patent No.: US 9,137,526 B2
(45) Date of Patent: Sep. 15, 2015

(54) IMAGE ENHANCEMENT VIA CALIBRATED LENS SIMULATION

(75) Inventors: Brian K. Guenter, Redmond, WA (US); Neel S. Joshi, Seattle, WA (US); Yichang Shih, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/465,959

(22) Filed: May 7, 2012

(65) Prior Publication Data

US 2013/0293761 A1 Nov. 7, 2013

(51) Int. Cl.
| | |
|---|---|
| *H04N 5/228* | (2006.01) |
| *G02B 13/16* | (2006.01) |
| *H04N 5/225* | (2006.01) |
| *G01N 21/00* | (2006.01) |
| *G01B 9/00* | (2006.01) |
| *G03B 43/00* | (2006.01) |
| *H04N 5/232* | (2006.01) |
| *H04N 17/00* | (2006.01) |
| *G03B 13/36* | (2006.01) |

(52) U.S. Cl.
CPC ............. *H04N 17/002* (2013.01); *G03B 13/36* (2013.01); *G03B 43/00* (2013.01); *H04N 5/23206* (2013.01); *H04N 5/23212* (2013.01)

(58) Field of Classification Search
CPC ........... G06T 7/0069; G02B 2207/129; G02B 27/0012; G02B 27/0025; H04N 5/2254; H04N 5/23212; H04N 5/2372
USPC ...................... 348/275, 292, 222.1, 335–369; 356/124.5, 239.1–239.8, 124
See application file for complete search history.

(56) References Cited

U.S. PATENT DOCUMENTS

| | | | |
|---|---|---|---|
| 6,567,570 B1 * | 5/2003 | Steinle et al. ................. 382/312 |
| 7,050,102 B1 | 5/2006 | Vincent | |
| 7,377,648 B2 | 5/2008 | Gross et al. | |
| 7,437,012 B2 | 10/2008 | Casrasso | |
| 7,477,802 B2 | 1/2009 | Milanfar et al. | |
| 7,489,828 B2 * | 2/2009 | Asad et al. .................... 382/254 |
| 7,616,826 B2 | 11/2009 | Freeman et al. | |
| 7,697,212 B2 | 4/2010 | Jethmalani et al. | |
| 7,792,357 B2 | 9/2010 | Kang | |
| 7,809,155 B2 | 10/2010 | Nestares et al. | |
| 7,961,970 B1 | 6/2011 | Georgiev | |
| 7,991,240 B2 | 8/2011 | Bakin et al. | |
| 8,264,553 B2 | 9/2012 | Joshi et al. | |
| 8,467,058 B2 * | 6/2013 | Lin ............................... 356/401 |
| 2003/0057353 A1 * | 3/2003 | Dowski et al. ............. 250/201.9 |

(Continued)

OTHER PUBLICATIONS

Maeda, et al., "Integrating Lens Design with Digital Camera Simulation", retrieved at <<http://white.stanford.edu/~brian/papers/ise/Maeda-Optics-SPIE-EI-5678-5.pdf>> Proceedings of the SPIE, Feb. 2005, vol. 5678, pp. 48-58.

(Continued)

*Primary Examiner* — Chia-Wei A Chen
(74) *Attorney, Agent, or Firm* — Sandy Swain; Judy Yee; Micky Minhas (57) ABSTRACT

The description relates to enhancing images. One device includes a lens configured to focus images on an image sensor. The device also includes point spread function (PSF) lens data relating to manufacturing specifications of the lens and a PSF measurement of the lens associated with a test image of a planar calibration pattern at a single depth of field.

20 Claims, 4 Drawing Sheets

LENS PRESCRIPTION CALIBRATION METHOD 200

(56) References Cited

U.S. PATENT DOCUMENTS

| | | | |
|---|---|---|---|
| 2003/0169944 A1* | 9/2003 | Dowski et al. | 382/279 |
| 2004/0096125 A1* | 5/2004 | Alderson et al. | 382/312 |
| 2005/0197809 A1* | 9/2005 | Dowski et al. | 703/6 |
| 2005/0212911 A1 | 9/2005 | Marvit et al. | |
| 2006/0279639 A1 | 12/2006 | Silverstein et al. | |
| 2007/0236573 A1* | 10/2007 | Alon et al. | 348/207.99 |
| 2007/0236574 A1* | 10/2007 | Alon et al. | 348/207.99 |
| 2007/0258707 A1 | 11/2007 | Raskar | |
| 2008/0136923 A1 | 6/2008 | Inbar et al. | |
| 2008/0174678 A1* | 7/2008 | Solomon | 348/231.99 |
| 2008/0175508 A1 | 7/2008 | Bando et al. | |
| 2008/0252882 A1 | 10/2008 | Kesterson | |
| 2008/0291286 A1 | 11/2008 | Fujihama et al. | |
| 2009/0091845 A1 | 4/2009 | Katakura | |
| 2009/0174782 A1 | 7/2009 | Kahn et al. | |
| 2009/0179995 A1 | 7/2009 | Fukumoto et al. | |
| 2009/0251588 A1 | 10/2009 | Hayashi | |
| 2010/0033604 A1* | 2/2010 | Solomon | 348/241 |
| 2010/0033618 A1 | 2/2010 | Wong et al. | |
| 2010/0079608 A1 | 4/2010 | Wong et al. | |
| 2010/0195047 A1 | 8/2010 | Dreher et al. | |
| 2010/0201853 A1 | 8/2010 | Ishiga | |
| 2010/0231732 A1 | 9/2010 | Baxansky et al. | |
| 2010/0245602 A1 | 9/2010 | Webster et al. | |
| 2010/0299113 A1 | 11/2010 | Robinson et al. | |
| 2010/0317399 A1 | 12/2010 | Rodriguez | |
| 2011/0019932 A1 | 1/2011 | Hong | |
| 2011/0033132 A1* | 2/2011 | Ishii et al. | 382/275 |
| 2011/0042839 A1* | 2/2011 | Tanimura et al. | 264/2.2 |
| 2011/0548752 | 3/2011 | Chen et al. | |
| 2011/0090352 A1 | 4/2011 | Wang et al. | |
| 2011/0122308 A1* | 5/2011 | Duparre | 348/340 |
| 2011/0134262 A1* | 6/2011 | Ogasahara | 348/222.1 |
| 2011/0148764 A1* | 6/2011 | Gao | 345/163 |
| 2011/0249173 A1* | 10/2011 | Li et al. | 348/349 |
| 2011/0249866 A1* | 10/2011 | Piestun et al. | 382/103 |
| 2011/0267477 A1* | 11/2011 | Kane et al. | 348/207.1 |
| 2011/0267485 A1* | 11/2011 | Kane et al. | 348/222.1 |
| 2011/0267486 A1* | 11/2011 | Kane et al. | 348/222.1 |
| 2011/0267507 A1* | 11/2011 | Kane et al. | 348/241 |
| 2011/0267508 A1* | 11/2011 | Kane et al. | 348/241 |
| 2011/0310410 A1* | 12/2011 | Shimomura | 358/1.9 |
| 2012/0076362 A1* | 3/2012 | Kane et al. | 382/106 |
| 2012/0154626 A1* | 6/2012 | Hatakeyama et al. | 348/223.1 |
| 2012/0169885 A1* | 7/2012 | Wang et al. | 348/180 |
| 2012/0242795 A1* | 9/2012 | Kane et al. | 348/46 |
| 2012/0307133 A1* | 12/2012 | Gao et al. | 348/349 |
| 2013/0002932 A1* | 1/2013 | Guenter et al. | 348/345 |
| 2013/0116981 A1* | 5/2013 | Alon et al. | 703/1 |
| 2013/0132044 A1* | 5/2013 | Paris et al. | 703/2 |
| 2013/0170765 A1* | 7/2013 | Santos et al. | 382/255 |
| 2013/0222624 A1* | 8/2013 | Kane et al. | 348/208.4 |
| 2013/0266210 A1* | 10/2013 | Morgan-Mar et al. | 382/154 |
| 2013/0286253 A1* | 10/2013 | Moon et al. | 348/234 |
| 2013/0308094 A1* | 11/2013 | Mohan et al. | 351/159.74 |
| 2013/0308197 A1* | 11/2013 | Duparre | 359/621 |
| 2013/0313418 A9* | 11/2013 | Campion et al. | 250/252.1 |
| 2013/0335535 A1* | 12/2013 | Kane et al. | 348/50 |
| 2014/0064552 A1* | 3/2014 | Miyagi et al. | 382/103 |

OTHER PUBLICATIONS

Small, et al., "Enhancing diffraction-limited images using properties of the point spread function", Retrieved at <<http://www.sbsp-limb.nichd.nih.gov/assets/pdfs/article_small_2006_opex.pdf>> vol. 14, Apr. 17, 2006, Issue 8, pp. 3193-3203.

Zhou, "Accurate Depth of Field Simulation in Real Time", Retrieved at <<http://www.cg.tuwien.ac.at/~ginko/v26i1pp015-023.pdf>> Mar. 23, 2007, vol. 26 (2007), No. 1 pp. 15-23.

Banham, et al., "Digital image restoration", Retrieved at <<http://ieeexplore.ieee.org/stamp/stamp.jsp?tp=&arnumber=581363>> Signal Processing Magazine, IEEE, 14(2), Mar. 1997, pp. 24-41.

Cannon, et al., "Blind deconvolution of spatially invariant image blurs with phase", retrieved at <<http://ieeexplore.ieee.org/stamp/stamp.jsp?tp=&arnumber=1162770>> Acoustics, Speech, and Signal Processing IEEE Transactions on, 24(1):58-63, 1976.

Kee, et al., "Modeling and removing spatially-varying optical blur", Retrieved at <<http://www.cs.dartmouth.edu/~erickee/papers/iccp11.pdf>> in Computational Photography (ICCP), 2011 IEEE International Conference on, pp. 1-8.

Levin, et al., "Image and depth from a conventional camera with a coded aperture", ACM Trans. Graph., 26:Article 70, Jul. 2007.

Nayar, et al., "Real-time focus range sensor", Retrieved at <<http://classes.soe.ucsc.edu/cmps290b/Fall05/readings/nayar-pami96.pdf>> IEEE Trans. Pattern Analysis amd Machine Intelligence, Zvol. 18 No. 12, Dec. 1996, pp. 1186-1198.

Zhou, et al., "Coded aperture pairs for depth from defocus", Retrieved at <<http://www.wisdom.weizmann.ac.il/~vision/courses/2010_2/papers/Zhou_ICCV09.pdf>> . In ICCV, Kyoto, Japan, Oct. 2009, pp. 8.

Yichang Shih et al., Image Enhancement Using Calibrated Lens Simulations, Computer Vision—ECCV 2012, Lecture Notes in Computer Science, vol. 7575, 2012, pp. 42-56.

"CIE Fluorescent Series: F1 to F12, 380nm to 730nm, Sampled at 5nm", from Munsell Color Science Laboratory, Online at <<<www.cis.rit.edu/research/mcs12/online/CIE/Fluorescents.htm>>> 4 Pages.

Brauers, J. et al.; "Direct PSF Estimation Using a Random Noise Target," in Digital Photography VI, 2010, Proceedings of SPIE-IS&T Electronic Imaging, SPIE vol. 7537, pp. 75370B-1-75370B-10, Jan. 2010.

Cathey, W.T. and E.R. Dowski; "New Paradigm for Imaging Systems," in Applied Optics, vol. 41, No. 29, Oct. 2002, pp. 6080-6092.

Conchello, J.A. and J.W. Lichtman; "Optical Sectioning Microscopy," in Nature Methods, vol. 2, No. 12, Dec. 2005, pp. 920-931; [Published Online Nov. 18, 2005 at <<<www.nature.com/naturemethods>>>].

Fergus, R. et al.; "Removing Camera Shake from a Single Photograph," in ACM Trans. Graph., vol. 25, 2006, pp. 787-794, Jul. 2006.

Goodman, J.W.; "Introduction to Fourier Optics", Second Edition, 1988, 457 Pages.

Hanrahan, P. and R. NG; "Digital Correction of Lens Aberrations in Light Field Photography," in International Optical Design, 2006, p. WB2.

Hausler, G.; "A Method to Increase the Depth of Focus by Two Step Image Processing," in Optics Communications, vol. 6, No. 1, Sep. 1972, pp. 38-42.

Joshi, N. et al.; "PSF Estimation Using Sharp Edge Prediction," in IEEE Conference on Computer Vision and Pattern Recognition, CVPR 2008, pp. 1-8, Jun. 2008.

Kang, S. B.; "Automatic Removal of Chromatic Aberration From a Single Image," in IEEE Conference on Computer Vision and Pattern Recognition, CVPR 2007, pp. 1-8, Jun. 2007.

Krist, J.E.; "Deconvolution of Hubble Space Telescope Images Using Simulated Point Spread Functions," in Astronomical Data Analysis Software and Systems, 1992, pp. 226-228.

Levin, A.; "Blind Motion Deblurring Using Images Statistics," in NIPS, 2006, pp. 841-848, Dec. 2006.

Levin, A. et al.; "Motion-Invariant Photography," in ACM Trans. Graph., vol. 27, No. 71, 2008, pp. 71-79, Aug. 2008.

McGuire Jr., J.P.; "Designing Easily Manufactured Lenses Using a Global Method," in International Optical Design Conference, 2006; SPIE-OSA vol. 6342, pp. 63420O-1-63420O-11, Jun. 2006.

Meiron, J.; "Damped Least-Squares Method for Automatic Lens Design," in Journal of the Optical Society of America (JOSA), Sep. 1965, vol. 55, No. 9; pp. 1105-1107.

Scalettar, B.A., et al.; "Dispersion, Aberration and Deconvolution in Multi-Wavelength Fluorescence Images," in Journal of Microscopy, Apr. 1996, vol. 182, Part 1, pp. 50-60.

Xu, L. and J. Jia; "Two-Phase Kernel Estimation for Robust Motion Deblurring," in ECCV 2010, Part I, LNCS, vol. 6311, pp. 157-170, Sep. 2010.

"Non-Final Office Action," from U.S. Appl. No. 13/170,192; Mailed Oct. 3, 2013, 16 pages.

"Response to Non-Final Office Action of Oct. 3, 2013," Filed Apr. 1, 2014 from U.S. Appl. No. 13/170,192; 12 pages.

(56) References Cited

OTHER PUBLICATIONS

"Final Office Action," from U.S. Appl. No. 13/170,192; Mailed Aug. 5, 2014, 16 pages.

"Response to Final Office Action of Aug. 5, 2014," Filed Oct. 28, 2014 from U.S. Appl. No. 13/170,192; 12 pages.

"Non-Final Office Action," from U.S. Appl. No. 13/170,192; Mailed Dec. 4, 2014, 18 pages.

"Non-final Office Action," from U.S. Appl. No. 12/616,782, Mailed Oct. 21, 2011, 12 pages.

"Final Office Action," from U.S. Appl. No. 12/616,782, Mailed Jan. 30, 2012, 12 pages.

"Notice of Allowance," from U.S. Appl. No. 12/616,782, Mailed May 17, 2012, 9 pages.

"Amendment after Allowance," from U.S. Appl. No. 12/616,782, filed Jul. 3, 2012, 7 pages.

Agarwala et al., "Interactive Digital Photomontage," Retrieved at <<http://grail.cs.washington.edu/projects/photomontage/photo-montage.pdf>>, Special Interest Group on Computer Graphics and Interactive Techniques, Aug. 8-12, 2004, pp. 1-9.

Bascle et al., "Motion Deblurring and Super-Resolution from an Image Sequence" Retrieved at <<http://eprints.kfupm.edu.sa/51907/1/51907.pdf>>, Proceedings of the 4th European Conference on Computer Vision, vol. II, 10 Pages, 1996.

Ben-Ezra et al., "Motion-Based Motion Deblurring" Retrieved at <http://www1cs.columbia.edu/CAVE/publications/pdfs/BenEzra_PAMI04.pdf>, IEEE Transactions on Pattern Analysis and Machine Intelligence, vol. 26, No. 6, Jun. 2004, pp. 689-698.

Chiang et al., "Local Blur Estimation and Super-Resolution" Retrieved at <<http://ieeexplore.ieee.org.xpl/freeabs_all.jsp?arnumber609422>>, 1997 IEEE Computer Society Conference on Computer Vision and Pattern Recognition (CVPR'97), 6 Pages, Jun. 1997.

Elder et al., "Local Scale Control for Edge Detection and Blur Estimation" Retrieved at <<http://eprints.kfupm.edu.sa/4903511/49035.pdf>>, IEEE Transactions on Pattern Analysis and Machine Intelligence, vol. 20, No. 7, Jul. 1998, pp. 699-715.

Joshi et al., "Image Deblurring using Inertial Measurement Sensors", Retrieved at <<http://research.microsoft.com/pubs/132794/imu_deblurring.pdf>>, Special Interest Group on Computer Graphics and Interactive Techniques Conference, Aug. 11-15, 2008, 9 Pages.

Klein et al., "Tightly Integrated Sensor Fusion for Robust Visual Tracking" Retrieved at <<http://svr-www.eng.cam.ac.uk/~gswk2/papers/KleinDrummond2004IVC.pdf>>, Jan. 23, 2004, pp. 1-15.

Le et al., "Restoration of Defocus Blur Image Based on Global Phase Coherence", Reteived at <<http://ieeexplore.ieee.org/stamp/stamp.jsp?tp=&arnumber5304202>>, 2nd International Congress on Image and Signal Processing, Oct. 17-19, 2009, 5 Pages.

Levin et al., "Understanding and Evaluating Blind Deconvolution Algorithms", Retrieved at <<http://www.wisdom.weizmann.ac.il/~levina/papers/deconvLevinEtalCVPR09.pdf>>, IEEE Conference on Computer Vision and Pattern Recognition (CVPR), Jun. 2009, 8 Pages.

Liu et al., "Simultaneous Image Formation and Motion Blur Restoration via Multiple Capture" Retrieved at <<http://ieeexplore.ieee.org/xpl/freeabs_all.jsp?arnumber941301>>, Proceedings of the Acoustics, Speech, and Signal Processing, 2001. On IEEE International Conference, vol. 03, 4 Pages, 2001.

Raskar et al., "Coded Exposure Photography: Motion Deblurring using Fluttered Shutter", Retrieved at <<http://citeseerx.ist.psu.edu/viewdoc/download?doi=10.1.1.61.5198&rep=rep1&type=pdf>>, Special Interest Group on Computer Graphics and Interactive Techniques Conference, Jul. 30-Aug. 3, 2006, 10 Pages.

Richardson, William Hadley, "Bayesian-based Iterative Method of Image Restoration", Retrieved at <<http://www.cs.duke.edu/courses/cps258/fall06/references/Nonnegative-iteration/Richardson-alg.pdf>>, Journal of the Optical Society of America, vol. 62, No. 1, Jan. 1972, pp. 55-59.

Saifuddin, Muhammad Umar Al-Maliki Bin., "Image Deblurring (Barcode)", Retrieved at <<http://psm.fke.utm.my/libraryfke/files/827_MUHAMMADUMARAL-MALIKIBINSAIFUDDIN2010.pdf>>, May 2010, 122 Pages.

Shan et al., "High-quality Motion Deblurring from a Single Image", Retrieved at <<http://cse.cuhk.edu.hk/~leojia/projects/motion_deblurring/deblur_siggraph08.pdf>>, Special Interest Group on Computer Graphics and Interactive Techniques Conference, Aug. 11-15, 2008, pp. 1-10.

Stewart, Charles V., "Robust Parameter Estimation in Computer Vision", Retrieved at <<http://citeseerx.ist.psu.edu.viewdoc/download?doi=10.1.83.4992&rep=1&type=pdf>>, SIAM Review, vol. 41, No. 3, Sep. 1999, pp. 513-537.

Strelow et al., "Optimal Motion Estimation from Visual and Inertial Measurements" Retrieved at <<http://www.ri.cmu.edu/pub_files/pub4/strelow_dennis_2002_1.pdf>>, Proceedings of the Workshop on Applications of Computer Vision, Dec. 2002, 6 Pages.

Tai et al., "Image/Video Deblurring using a Hybrid Camera" Retrieved at <<http://www.cs.washingtion.edu/homes/duhao/papers/cvpr2008_hybriddeblurring.pdf>>, IEEE Conference on Computer Vision and Pattern Recognition (CVPR), 2008, 8 Pages, Jun. 2008.

Van et al., "Identifying Source Cell Phone Using Chromatic Aberration", Retrieved at http://ieeexplore.ieee.org/stamp/stamp.jsp?tp=&arnumber=4284792>, IEEE International Conference on Multimedia and Expo, Jul. 2-5, 2007, pp. 883-886.

Veeraraghavan et al., "Dappled Photography: Mask Enhanced Cameras for heterodyned Light Fields and Coded Aperture Refocusing", Retrieved at <<http://www.merl.com/papers/docs/TR2007-115.pdf>>, TR2007-115, Jul. 2007, 14 Pages.

Yuan et al., "Image Deblurring with Blurred/Noisy Image Pairs", Retrieved at <<http://www.cs.ust.hk/~quan/publications/yuan-deblur-suggraph07.pdf>>, Special Interest Group on Computer Graphics and Interactive Techniques Conference, Aug. 5-9, 2007, 9 Pages.

Response Filed Mar. 4, 2015 to the Non-Final Office Action Mailed Dec. 4, 2014, From U.S. Appl. No. 13/170,192; 15 Pages.

Supplemental Response Filed Apr. 15, 2015 From U.S. Appl. No. 13/170,192; 7 Pages.

Notice of Allowance Mailed Apr. 28, 2015 From U.S. Appl. No. 13/170,192; 8 Pages.

* cited by examiner

IMAGE ENHANCEMENT VIA CALIBRATED LENS SIMULATION

BACKGROUND

Image capturing devices, such as cameras, tend to have a lens that focuses an image on an image sensor, such as film or a charge coupled device (CCD). Lens distortions, called aberrations, limit the sharpness of the image formed by the lens. Aberrations can be grouped into two general types: those that are caused by design compromises of a lens model or specification; and those that are caused by deviations from the lens model when individual lenses are made. These aberrations can decrease image quality even if the lens is perfectly focused.

SUMMARY

The described implementations relate to enhancing images. One implementation can include a lens configured to focus an image on an image sensor that is configured to capture the image. In this case, the lens is a known model. This implementation can also include calibration data relating to a planar calibration pattern captured through the lens at a single depth of field. The implementation can include an image enhancement component configured to receive the captured image and to utilize a point spread function (PSF) calculated from the calibration data to produce an enhanced image.

Another implementation can include a lens configured to focus images on an image sensor. The implementation can also include PSF lens data relating to manufacturing specifications of the lens and a PSF measurement of the lens associated with a test image of a planar calibration pattern at a single depth of field.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to enhancing images (e.g., photos). The images can be captured by an imaging device, such as a dedicated camera or video camera, or by a device that offers a camera functionality, such as a cell phone, smart phone, or personal digital assistant, among others. As used herein, a device that offers a camera functionality can be thought of as a camera regardless of other functionalities offered by the device. The camera can include a lens (or multiple lenses). The lens can be manufactured according to a lens model specification. The lens model specification may knowingly include aberrations in an attempt to lower manufacturing costs and/or for other reasons. Also, the manufacturing process can introduce deviations (e.g., variance) from the model specification in individual lenses. These deviations can introduce additional aberrations. The aberrations can be reduced by deconvolving an image using a lens point spread function (PSF). However, fully measuring the PSF tends to be laborious and prohibitive. Alternatively, the PSF can be simulated if the lens model is known. However, this only addresses aberrations introduced in the lens model and not aberrations introduced by manufacturing deviation. As a result, the simulated PSF may be a poor match to measured data. The present concepts can address both types of aberrations. Specifically, the present techniques can take a PSF measurement at a single depth for an individual lens. The PSF measurement can then be used to calibrate the lens model. The fitted model can then be used to compute the PSF for any desired setting of lens parameters for any scene depth, without additional measurements or calibration. The fitted model gives deconvolution results comparable to full measurement but is much more compact and can be accomplished with hundreds of times fewer calibration images.

Figure 1:
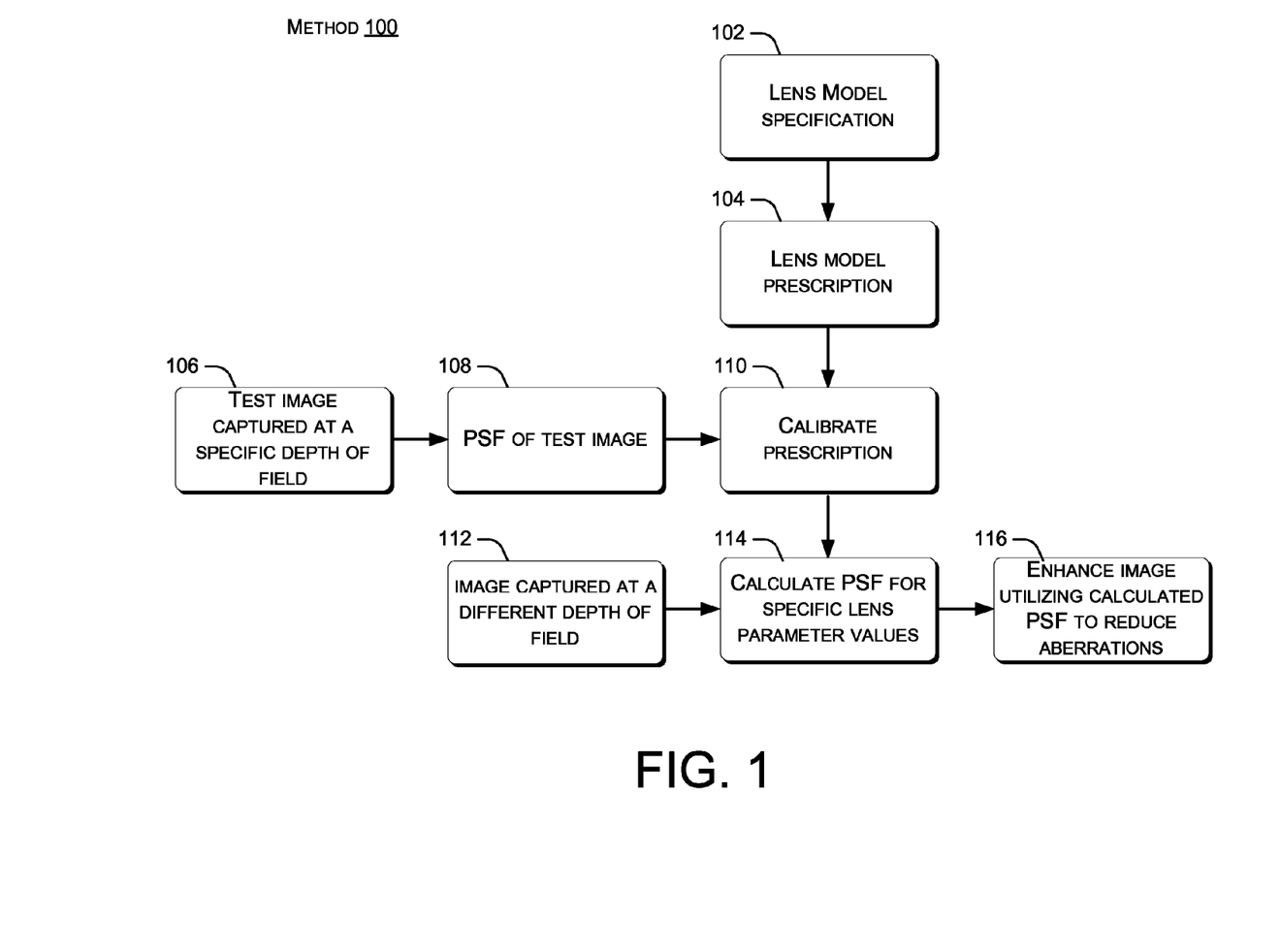
FIGS. 1-2 are flowcharts of exemplary image enhancement techniques in accordance with some implementations of the present concepts.

For purposes of explanation consider introductory FIG. 1, which shows an image enhancement method 100.

This implementation can obtain a specification for a model of a lens (lens model) at 102. The specification can relate to the geometry of the lens. Due to various design considerations, such as cost of manufacturing, the lens specification can include parameters that are not optically ideal. These parameters can cause aberrations in images captured through a lens that conforms to the specifications.

An individual lens model may be utilized in a single model of cameras. For instance, the lens model may be designed for a specific smart phone model. In another case, a lens model may be incorporated into multiple different camera models. In a further example, the lens model may be interchangeable between different camera models. For instance, SLR (single-lens reflex) camera lenses may be used with multiple cameras and/or camera models.

A prescription for the lens model can be obtained at 104. In some cases, the lens prescription may be exactly the same as the specification. In other cases, the prescription may include some parameters from the specification and ignore other parameters from the specification. The prescription can be thought of as addressing the aberrations of the lens model caused by the design considerations.

For an individual lens of the lens model, the method can capture a test image at a specific depth of field at 106. In one case, the test image is a planar point light source array. In one example, the test image can be captured as part of the lens manufacturing process and/or as part of the process of incorporating the lens into a camera. In another example, the test image can be captured by a consumer who purchases the lens.

The method can compute a point spread function (PSF) of the test image for the lens at 108. The PSF can be relevant for the specific depth of field of the test image, but less relevant for other depths of field. The PSF of the test image can be utilized to calibrate the lens model prescription at 110.

The method can obtain an image captured by the lens at a different depth of field than the test image at 112. The calibrated prescription can be utilized to calculate a lens-specific PSF for specific lens parameter values for focus depths and illumination spectra at 114. Thus, the calibrated prescription can allow PSFs to be generated that compensate for parameter value differences between the test image and the captured image.

The calculated PSF can be utilized to enhance the image by reducing lens induced aberrations at 116. The lens induced aberrations can include aberrations caused by the lens model specification and by deviations from the lens model specification during manufacture of the individual lens.

To summarize, lens aberrations limit the quality of images formed by lenses. These aberrations come from two major sources: the specification of a lens model and deviations from the lens model imparted on an individual lens during the manufacturing process. The deviations affect optical image formation and vary as a function of lens aperture, focal length, light wavelength (chromatic aberration), and/or focusing distance, among others. Image deconvolution can be used to remove many aberrations. However, enhanced results can be obtained if the lens PSF is known, allowing the use of non-blind deconvolution. If the PSF is not known, the PSF can be estimated. Recovering both the PSF and deblurred image from a single image input (blind deconvolution) is ill-posed and as a result can be unreliable, as the observed blurred image provides only a partial constraint on the solution.

Unfortunately, accurate PSF measurement is challenging. For a fixed focal length lens, the PSF can vary with light wavelength, lens aperture, image plane position, object plane distance, and back focal plane distance, among others. Sampling this six dimensional space accurately can entail an inordinate number of images, and can also entail precise automated equipment to carry out, especially for more than one or two lenses. Additionally, PSF values between measured values tend to be unknown. Existing methods interpolate the measured PSF or fit the PSF to a parametric model, but these do not generate physically accurate PSFs for the complex lenses that are commonly used in photography. Some technologies can employ a calibration target but utilize hundreds of test images to obtain accurate PSFs.

The present implementations can simulate the lens PSF using the lens specification. The lens PSF can be computed with wave optics, such as via the Rayleigh-Sommerfield diffraction integral. A prescription for the lens model based upon the lens specification can serve as a starting point for an image enhancement process. The image enhancement process can change lens parameters so that it better matches measured data. This fitting process addresses the variations of individual lenses from the lens specification. These variations can cause dramatic PSF variations.

In some implementations, the calibration process can use a small number, even a single photograph, of an in-focus, planar point light source array at a measured depth. After enhancing/optimizing the lens model, a PSF can be generated to be used with image deconvolution to enhance image quality.

PSF Simulation

Existing techniques tend to make simplifying assumptions about the lens point spread function to improve images. However, real lenses violate all these assumptions. For instance, PSFs of a lens obtained at two image positions, two focus/defocus distances, and two focal plane depths show significant differences between the PSFs. Even on the optical axis, there are significant differences between the PSF; off-axis the differences can be dramatic. Perhaps most surprisingly, the PSF tends to be strongly dependent on the distance at which the lens is focused.

In the general case, the PSF of a fixed focal length lens can be characterized as a six dimensional function of the light wavelength ($\lambda$), image plane coordinates (x,y), lens aperture (a), lens to object distance ($d_{obj}$), and back focal distance ($d_{bf}$). PSFs for a particular lens can be obtained by taking measurements of the lens response over these six dimensions, but such methods tend to only be accurate in limited working volumes and can require a vast amount of data to be collected.

Modern lenses tend to be designed using lens CAD models and are precisely specified by a set of parametric values called the lens specification or prescription. The present techniques can utilize a single photograph to calibrate the lens prescription. The calibrated or fitted lens model can be used to generate PSFs at any desired lens parameter values. Accurate PSFs for other parameter values can be calculated from this fitted lens model.

Lens Prescriptions

The lens prescription can be thought of as describing the optical properties of the lens: the size, curvature, index of refraction, and type of coating of each element, among others. To account for chromatic aberration, a dispersion function can model the variation of the index of refraction with light wavelength, 2. Commonly used functions are polynomials in either the Schott $$n^2 = a_0 + a_1\lambda^2 + a_2\lambda^{-2} + a_3\lambda^{-4} + a_4\lambda^{-6} + a_5\lambda^{-8} \qquad (1)$$

or the Sellmeier 1 form $$n^2 - 1 = \frac{K_1\lambda^2}{\lambda^2 - L_1} + \frac{K_2\lambda^2}{\lambda^2 - L_2} + \frac{K_3\lambda^2}{\lambda^2 - L_3}. \qquad (2)$$

The present techniques are applied to modeling the effect of the following parameters: 1) geometric properties of each optical surface: diameter, radius of curvature (for aspherical surfaces the parameters could be the coefficients of the polynomial, or other function, which describes the surface), offset along optical axis, and offset perpendicular to optical axis, 2) coefficients of the dispersion function of each material, 3) index of refraction and thickness of each antireflection coating material, and 4) lens back focal distance. Of course, other parameters can be modeled.

Hybrid Ray Tracing

Given a lens model and a scene, PSFs can be simulated by a combination of geometric and wave optics. In some cases this hybrid ray tracing/wave optics simulation can compute the lens PSF by evaluating the scalar Rayleigh-Sommerfield diffraction integral:

$$U(p_1) = \frac{1}{j\lambda} \int\int_\Sigma U(p_0) \frac{e^{jkr}}{r} \cos\theta \, ds \qquad (3)$$

where $\lambda$ is the wavelength, $$k = \frac{2\pi}{\lambda}$$

is the wavenumber, $U(p_0)$ is the field intensity at point $p_0$ on the wavefront, r is the distance from a point on the wavefront $p_0$, and a point on the image plane, $p_1$, and $\theta$ is the angle between the normal to the wavefront and the vector $p_1-p_0$. This integral gives the field intensity, $U(p_1)$, at a point $p_0$ on the image plane. The double integral is evaluated over the surface of the wavefront, (such as the lens surface closest to the image sensor), and the image plane itself. For polychromatic light Eq. 3 is evaluated for each wavelength, λ, and the results summed incoherently.

In some implementations, rays are traced through all but the last lens surface using conventional ray tracing, keeping track of the complex phase as the ray passes through optical elements. At the last lens surface, the ray is treated as a full phasor quantity. In principal, the phasor evaluation for each ray can cover the entire image plane but this may be computationally infeasible for high resolution sensors. However, for a lens with reasonably corrected aberrations the PSF rapidly falls to zero away from the ray image plane intersection. This fact can be exploited or leveraged to compute a conservative upper bound on the size of the phasor region. This upper bound can greatly reduce computation while still accurately representing the PSF of the lens.

One implementation can start by computing a local origin for the PSF by finding the centroid of all rays intersecting the image plane. Rays which intersect the image plane at a distance greater than kd from the local origin can be discarded, where k is an empirically chosen constant, and d is the diameter of the first maximum of the Airy disk.

$$d = \frac{1.22\,\lambda}{NA}$$

The numerical aperture, NA, is given by $$NA = n\,\sin(\theta max)$$

where n is the index of refraction of the medium the last ray is traveling through. For lenses simulated in air, the index of refraction is close to 1.

In one implementation, the numerical aperture, NA, is computed by sampling along a radial line along the lens. The radial line passes through the optical axis. The maximum angle, θ, can be determined. The maximum angle can be thought of as the greatest angle at which rays from the object point are not occluded by the lens.

Some implementations can strive to achieve the highest possible resolution of the measured PSFs. One such implementation can use a monochrome sensor with small pixels (2.2 microns), and sequential RGB (red green blue) illumination from a three color LED (light emitting diode) lamp. Because the PSF is dependent on wavelength this implementation simulated the PSF at 18 wavelengths for each color channel. The resultant PSFs can be summed incoherently to give the final PSF for each color channel. This implementation can use sequential color so that artifacts due to demosaicing would not be confounded with the results of the image corrections. However, other implementations can easily be used with Bayer demosaicked images, among others. Note also that while LED lamps are used in this implementation, other implementations can use lasers for the precise wavelengths that they generate. Since PSFs are dependent upon wavelength, accurate PSFs can be calculated for each laser's wavelength.

Geometric Distortion Removal

Some implementations can also reduce or remove geometric distortion. For instance, geometric ray tracing using the above mentioned simulator, can compute the correspondence between object space and image space. The image can be warped with this correspondence to remove geometric distortion.

Lens Prescription Calibration

In some implementations the lens simulation can be notated using the function S(l,x), which takes a lens prescription l and light source positions x as input, and outputs the corresponding point spread functions P. Let $l^*$ and $l_s$ denote the actual and nominal lens specification, respectively. The object of the lens fitting step is to find $\delta l^* \equiv l^* - l_s$.

Optimization Scheme

Some implementations can be viewed as employing enhancement/optimization methods. These optimization methods can reduce and/or minimize the L2 norm between the measured and the simulated PSFs by adjusting the lens prescription. Denoting the measured PSFs as P*, the objective function is:

$$\delta l^* = \arg\min_{\delta l} \| S(l_s + \delta l, x) - P^* \|_2. \quad (4)$$

Given that δl is very small and S is smooth around $l_s$, the first order approximation on $S(l_s+\delta l, x)$ is $$S(l_s + \delta l, x) \approx S(l_s) + \frac{\partial S}{\partial l}\delta l, \quad (5)$$

where $S(l_s)$ is the PSF simulated using the nominal lens prescription, and $$\frac{\partial S}{\partial l}$$

is the Jacobian at $l_s$, which is denoted by J. Denoting $\delta P = P^* - S(l_s)$ as the difference between simulated and measured PSFs and combining Eq. 4 and Eq. 5 gives $$\delta l^* = \arg\min_{\delta l} \| J\delta l - \delta P \|_2 = J^\dagger \delta P \quad (6)$$

In some implementations, the calibration process first calculates the Jacobian, and then applies the Jacobian pseudo-inverse to the difference between measured and simulated PSFs. In practice, S is not linear to l, so δl can be multiplied by a damping factor $k_d < 1$, and iterate several times until convergence, which typically takes 3 to 5 iterations. This optimization scheme is shown in FIG. 2.

Figure 2:
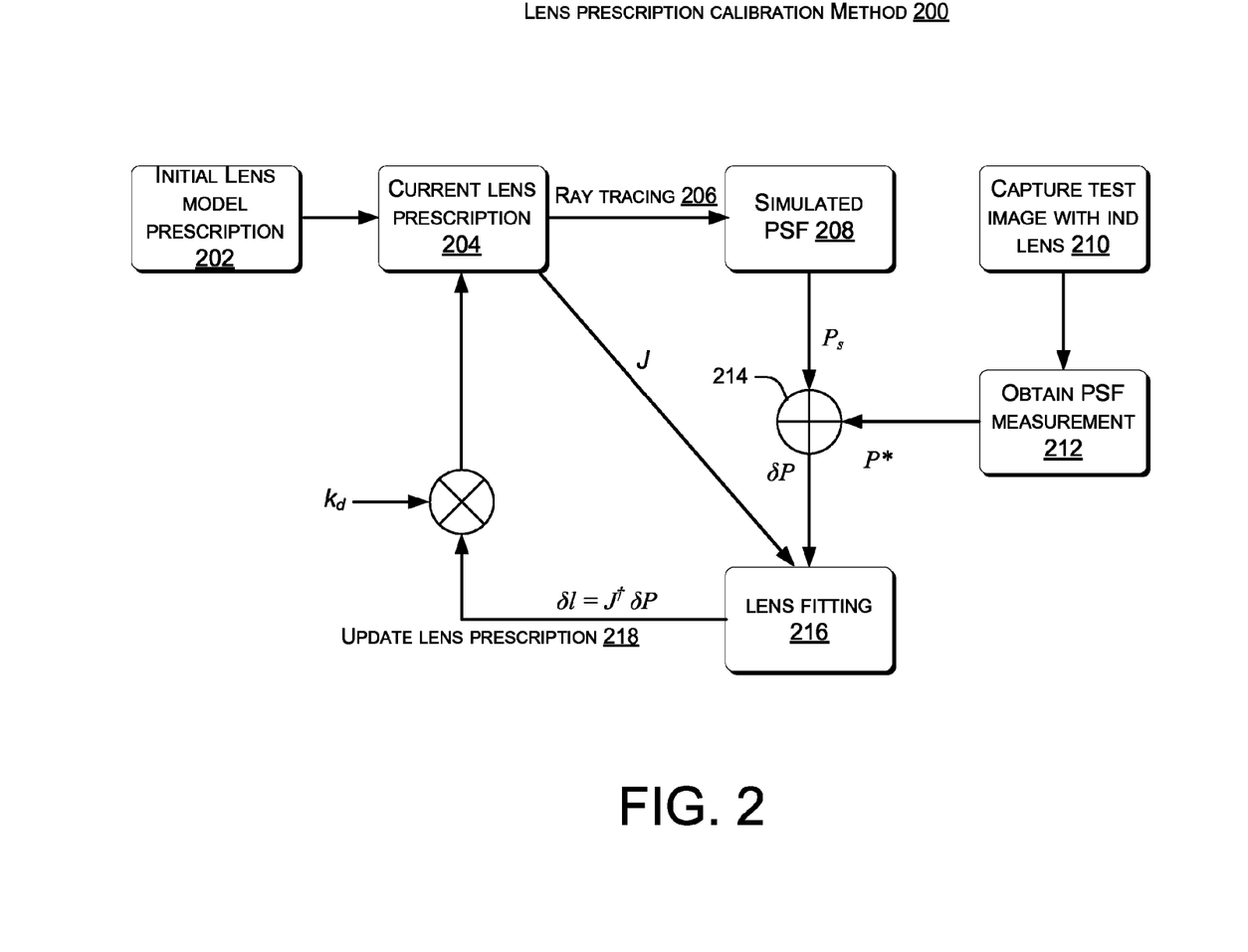

Briefly, FIG. 2 shows a lens prescription calibration method 200. The method starts with an initial lens prescription at 202. This initial lens prescription can be thought of as a lens model prescription. The lens model prescription can be used as the basis of the current lens prescription at 204. Thus, this initial lens prescription may only address aberrations caused by the lens specification. Ray tracing 206 can be performed on the current lens prescription to produce simulated PSFs at 208. A test image can be captured with the individual lens at 210. Measured PSFs 212 can be obtained from the test image. The measured PSFs 212 and the simulated PSFs 208 can be compared at 214 to contribute to the lens fitting optimization 216. The measured PSFs address deviations in the individual lens from the lens model specification. Accordingly, the lens fitting optimization can address both lens model aberrations and individual lens aberrations. The lens fitting can be utilized to update the current lens prescription 204 as indicated at 218. This process can be repeated in an iterative fashion to enhance the accuracy of the lens prescription.

Optimized Variables

The variables in the optimization scheme are parameters in the lens prescription. Here those parameters are divided into three groups by their properties: surface variables, glass variables, and camera variables. Their effects on the PSF are discussed below.

Surface Variables

This group consists of the radius of curvature, XY offset (perpendicular to the optical axis), and Z offset (parallel to optical axis) of each optical element. This implementation operates on the assumption that the lenses are spherical lenses. As such, surface tilting can be modeled by a combination of X, Y, and Z offsets. Other implementations can operate on aspherical lenses. The aspherical lenses can be characterized as a set of curved (or radial) surfaces starting at the center of the lens and extending radially therefrom. The set of curved surfaces can be expressed as polynomials.

Glass Variables

This group consists of the coefficients of the dispersion function formula. The dispersion function affects chromatic aberration as different wavelengths have different refraction indices. Chromatic aberration tends to be highly affected by the first derivative of the dispersion function $$\frac{dn}{d\lambda}.$$

As a simplification some implementations only optimize this first derivative for each glass. The PSF shapes tend to be similar, but the chromatic aberration changes significantly.

Camera Variables.

This group consists of the object distance and back focal length. Small differences in the back focal length can have a significant effect on the PSF. For example, if the physical focusing process focuses on blue light and the simulator focuses on red light, then the simulated blue PSF component will be smaller than the actual one. Thus, the actual back focal length is calibrated instead. Variations in the object distance have little effect on the simulated PSF, so it may or may not be included in the optimization.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

Figure 3:
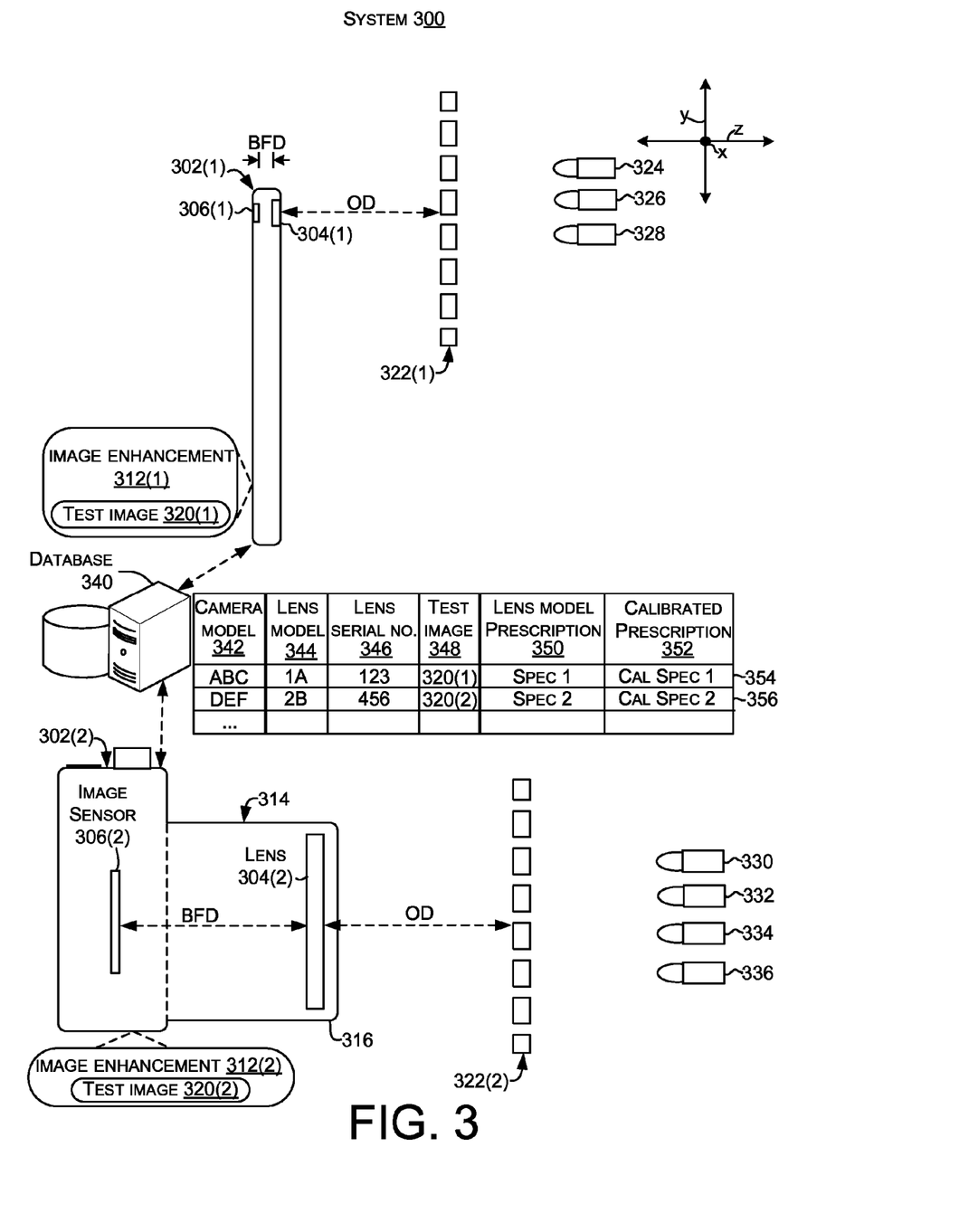
FIGS. 3-4 show exemplary image enhancement systems in accordance with some implementations of the present concepts.

FIG. 3 shows a calibration system 300. This calibration system is explained relative to two cameras 302(1) and 302 (2), for purposes of explanation. These cameras each include a lens 304, an image sensor 306 and an image enhancement component 312 (with the suffix '1' utilized to refer to camera 302(1) and the suffix '2' utilized to refer to camera 302(2)). In this example, camera 302(1) is manifest as a smartphone and camera 302(2) is manifest as an SLR camera body. The SLR camera body can be removably coupled to multiple interchangeable 'lens devices'. The term 'lens device' 314 as used herein can include the lens 304(2) (and/or multiple lenses) and other components, such as a housing 316.

During manufacture, or at a subsequent time, a test image 320 can be captured with an individual camera 302(1) and/or 302(2). In the case of camera 302(1), the test image 320(1) is captured through a calibration target 322(1). Illumination for the test image 320(1) is provided by three LEDs 324, 326, and 328 that are configured to provide green, red, and blue wavelength light, respectively. In the case of camera 302(2), the test image 320(2) is captured through a calibration target 322(2). Illumination for the test image 320(2) is provided by four lasers 330, 332, 334, and 336 that are configured to provide four distinct wavelengths of visible light, respectively. Other implementations can use other numbers and/or types of light sources besides the three and four shown here.

The test images 320(1) and 320(2) can be stored locally on the camera and/or communicated to a database 340. The database can serve to map the test image to the individual lens that captured the test image. In the illustrated configuration, database 340 includes a camera model column 342, a lens model column 344, a lens serial number column 346, a test image column 348, a lens model prescription column 350, and a calibrated prescription column 352. Other database implementations may include additional and/or different columns, such as camera serial number, surface variables, glass variables, and/or camera variables described above, etc.

An individual horizontal row of the database 340 can be dedicated to an individual lens to be identified, such as by serial number. For instance in this example, horizontal row 354 relates to lens 304(1) and horizontal row 356 relates to lens 304(2). For sake of brevity, the rows are populated with hypothetical values. As described above and below, the individual lens' test image can be used to calibrate the lens model prescription for that lens. The calibrated prescription can then be used to enhance other images captured with the lens. One such configuration is described below relative to FIG. 4.

In some configurations, an individual camera 302(1) or 302(2) can compute its corresponding calculated prescription from the test image 322(1) or 322(2), respectively. In other configurations, the computations may be performed at the database 340 and then the calculated prescription can be sent to the camera for local storage. The camera's image enhancement component 312 can utilize the prescription to enhance subsequent images captured by the camera. In still other configurations, the calculated prescription may be maintained at the database and applied to other images received from the camera to produce enhanced images. These enhanced images can then be accessed and/or downloaded by a user of the camera or other authorized user. In still other implementations, the test image may simply be stored until a predefined condition occurs. For instance, the test image can be stored until a user of the camera requests image enhancement. At that point, the test image can be processed as described above to generate the calibrated prescription utilized in the image enhancement process. Such a configuration can reduce resource usage involved in calculating calibrated prescriptions that may never actually be used for various reasons.

Lens Measurements

Cameras 302(1) and 302(2) can be utilized to capture test images of calibration targets 322(1) and 322(2), respectively. For each test image, the object distance (OD) can be measured and the back focal distance (BFD), among other parameters, can be estimated. The point-spread function can be simulated with these parameters.

The information from the test images can be used to calibrate and measure the simulated point spread functions. A standard I3A/ISO Resolution Test Chart from BHPhoto can be used to measure effective image resolution. Impulse responses can be measured with calibration targets manifest as specially prepared boards. In one example, the boards can consist of laser-cut 0:1 mm diameter pinholes into an aluminized Mylar sheet. The Mylar sheet can then be mounted on a flat acrylic backing coated with a diffusing material. This calibration target can be backlit with the light source.

Calibration

Lens calibration can involve a high number of variables. Non-linear optimization of this number of variables can be challenging. Instead of optimizing all variables together, the variables can be divided into groups, such as three groups. Individual groups can then be serially optimized. In one implementation, the damping factor, $k_d$, is set to 0.7, and iterated multiple times.

The calibration process can take multiple measured PSF samples for the individual respective lenses. These PSFs can be measured at a single focusing distance and captured with a single test image. The un-calibrated PSFs tend to have more significant differences at the corners, so sampling density can be higher at the edges than at the center. While a single photograph and focal plane can be used for calibration, the extension to multiple planes can be employed.

The manufacturing tolerance of each parameter tends to be on the order of 1%, so the offsets can be set to 0.5% for radius, $10^{-5}$ m for XYZ offsets, 1% of dispersion at the red frequency for the dispersion function offset, and $10^{-5}$ m for back focal length, in one implementation. The numerical derivatives can be approximated with a two sided finite difference.

During the simulation, super samples of the PSF up to 3× of the actual camera resolution can be used to avoid aliasing. Both PSF computation and Jacobian calculation can be performed in parallel.

Figure 4:
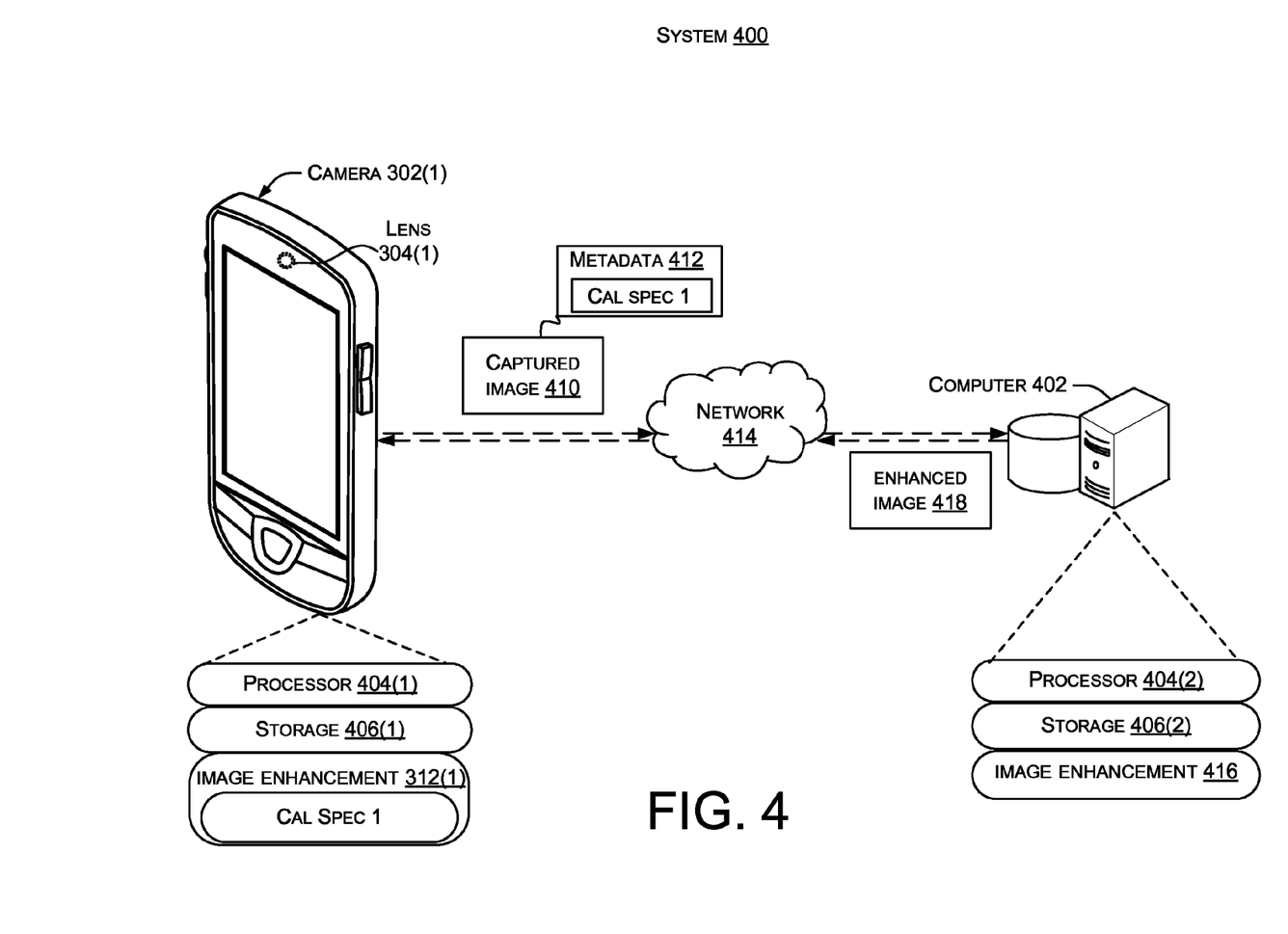

FIG. 4 shows another system 400 that includes camera 302(1) and a computer 402. In this implementation, camera 302(1) includes a processor 404(1) and storage 406(1). Similarly, computer 402 includes a processor 404(2) and storage 406(2). Accordingly, in the present discussion, camera 302(1) can be characterized as a computer.

The term "computer" or "computing device" as used herein can mean any type of device that has some amount of processing capability and/or storage capability. Processing capability can be provided by one or more processors that can execute data in the form of computer-readable instructions to provide a functionality. Data, such as computer-readable instructions, can be stored on storage 406. The storage can be internal and/or external to the computer. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Returning to FIG. 4, camera 302(1) can capture an image via lens 304(1). (The lens 304(1) is positioned on a back surface of the camera and is therefore shown in 'ghost' (e.g., dashed lines)). In some implementations, the image enhancement component 312(1) can utilize the calibrated prescription (cal spec 1) to enhance the captured image to create an enhanced image. In this example, the calibrated prescription can be obtained from row 354 of database 340 of FIG. 3. The enhanced image can be of higher quality in regards to one or multiple parameters. This aspect is described in more detail above and below. In one such implementation, assume that the calibrated prescription was determined for the camera as described above relative to FIG. 3. and that the calibrated prescription was installed on non-volatile storage of the camera as part of the manufacturing process, such as by the manufacturer or another entity. In such a configuration, the image enhancement component can be configured to receive the captured image and to utilize a PSF calculated from the calibration data (e.g., the calibrated prescription) to produce the enhanced image.

In another implementation, camera 302(1) can capture an image 410. The camera can associate the calibrated prescription "Cal Spec 1" with the captured image 410 in the form of metadata 412. The captured image and the calibrated prescription can be communicated to computer 402 via network 414. Computer 402 can include an image enhancement component 416. This image enhancement component 416 can enhance the captured image utilizing the calibrated prescription 'Cal Spec 1' to produce enhanced image 418. The enhanced image 418 can be stored by computer 402 and/or sent back to camera 302(1).

In still another implementation, camera 302(1) may not include the test image or the calibrated prescription, but may include a serial number or other unique identifier that can be associated with captured images as metadata. Computer 402 can receive the captured image and utilize the unique identifier to obtain the test image or the calibrated prescription from database 340 (FIG. 3). If the computer obtains only the test image the computer can generate the calibrated prescription. In either case, the computer can use the calibrated prescription to enhance the captured image. Computer 402 may have more available resources, such as storage, processing cycles, and/or power, than camera 302(1) and as such may be able to allow the camera's resources to remain available for other uses, rather than being expended enhancing images.

In some configurations, computer 402 may belong to an owner of camera 302(1) or computer 402 may be a server computing device controlled by a different entity. Further, while a distinct computer 402 is illustrated here, the provided functionality can be offered in a cloud computing scenario.

In the illustrated implementation camera 302(1) is configured with a general purpose processor 404(1) and storage 406(1). In some configurations, the camera can include a system on a chip (SOC) type design. In such a case, functionality provided by the camera can be integrated on a single SOC or multiple coupled SOCs. In one such example, the camera can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include image enhancement component 312(1).

Shared resources can be storage, processing units, etc. that can be used by multiple functionalities. In this example, the shared resources can include the processor. In one case, image enhancement component 312(1) can be implemented as dedicated resources. In other configurations, this component can be implemented on the shared resources and/or the processor can be implemented on the dedicated resources. In some configurations, the image enhancement component 312(1) can be installed during manufacture of the camera or by an intermediary that prepares the camera for sale to the end user. In other instances, the end user may install the image enhancement component 312(1), such as in the form of a downloadable application or from a USB thumb drive, among others.

CONCLUSION

Although techniques, methods, devices, systems, etc., pertaining to image enhancement scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one computing device, the method comprising:
    obtaining a lens model prescription of a lens model, wherein the lens model prescription addresses lens model aberrations associated with multiple different lenses of the lens model and the lens model prescription is associated with a simulated point spread function;
    obtaining a measured point spread function fitted to an individual lens of the lens model, wherein the measured point spread function addresses deviations in the individual lens of the lens model;
    calibrating the lens model prescription to the individual lens by comparing the measured point spread function to the simulated point spread function; and
    enhancing an image captured with the individual lens using the calibrated lens model prescription.

2. The method of claim 1, wherein the calibrating the lens model prescription comprises:
    obtaining a test image of a planar calibration pattern at a single depth of field; and
    calculating the measured point spread function at the single depth of field.

3. The method of claim 2, wherein the obtaining a test image comprises illuminating the planar calibration pattern with multiple different lasers.

4. The method of claim 2, wherein the obtaining a test image comprises capturing the test image.

5. The method of claim 2, wherein the individual lens is associated with a camera and the obtaining a test image comprises obtaining the test image from the camera.

6. The method of claim 2, further comprising:
    calculating a fitted point spread function for the individual lens using the calibrated lens model prescription, wherein the fitted point spread function compensates for specific lens parameter values including different depths of field.

7. The method of claim 1, wherein the lens model prescription compensates for design-induced aberrations common to each of the multiple different lenses of the lens model, and the calibrated lens model prescription compensates for manufacturing-induced aberrations in the individual lens that are not present in other lenses of the lens model.

8. A device, comprising:
    a lens configured to focus images on an image sensor;
    one or more hardware processors; and
    hardware storage storing:
        data representative of a point spread function, the point spread function relating to:
            manufacturing specifications of the lens, and
            a point spread function measurement of the lens associated with a test image of a planar calibration pattern at a single depth of field, and
        computer-readable instructions which, when executed by the one or more hardware processors, cause the one or more hardware processors to enhance an image captured with the lens by using the data representative of the point spread function to compensate for both design-induced aberrations caused by the manufacturing specifications of the lens and manufacturing-induced aberrations caused by deviations in the lens from the manufacturing specifications.

9. The device of claim 8, wherein the representative of the point spread function comprises the test image and the manufacturing specifications.

10. The device of claim 8, wherein the data representative of the point spread function comprises a fitted point spread function, wherein the fitted point spread function that is based upon another point spread function for the manufacturing specifications that is fitted to the point spread function measurement of the test image.

11. The device of claim 8, wherein the device includes the image sensor.

12. The device of claim 8, wherein the computer-readable instructions cause the one or more hardware processors to:
    calculate the point spread function from a calibrated prescription for the lens, the calibrated prescription being calibrated for both the design-induced aberrations and the manufacturing-induced aberrations.

13. The device of claim 12, wherein the computer-readable instructions cause the one or more hardware processors to:
    determine the calibrated prescription by comparing the point spread function measurement to a simulated point spread function for the manufacturing specifications.

14. A device, comprising:
    one or more hardware processors; and
    hardware storage storing computer-readable instructions which, when executed by the one or more hardware processors, cause the one or more hardware processors to:
        obtain a lens model prescription of a lens model, wherein the lens model prescription addresses lens model aberrations associated with multiple different lenses of the lens model;
        obtain a measured point spread function for an individual lens of the lens model, wherein the measured point spread function addresses deviations in the individual lens from the lens model; and
        calibrate the lens model prescription to the individual lens using the measured point spread function to obtain a calibrated lens model prescription.

15. The device of claim 14, further comprising the individual lens.

16. The device of claim 14, wherein the computer-readable instructions cause the one or more hardware processors to:
    calibrate the lens model prescription by performing optimization on parameters of the lens model prescription.

17. The device of claim 16, wherein the optimization is performed on surface variables, glass variables, and camera variables.

18. The device of claim 14, wherein the computer-readable instructions cause the one or more hardware processors to:
    obtain a test image that is captured using the individual lens of the lens model; and
    use the test image to determine the measured point spread function.

19. The device of claim 14, wherein the computer-readable instructions cause the one or more hardware processors to:
    send the calibrated lens model prescription to a camera that includes the individual lens.

20. The device of claim 14, wherein the computer-readable instructions cause the one or more hardware processors to:
    obtain an image captured by a camera that includes the individual lens;

use the calibrated lens model prescription to enhance the image to obtain an enhanced image; and
send the enhanced image to the camera.

* * * * *